United States Patent
Furukawa

(10) Patent No.: US 6,652,087 B2
(45) Date of Patent: Nov. 25, 2003

(54) IMAGE FORMATION

(76) Inventor: Ken-ichi Furukawa, 1-11-13, Yukarigaoka, Sakura-shi, Chiba (JP)

(*) Notice: Subject to any disclaimer, the term of this patent is extended or adjusted under 35 U.S.C. 154(b) by 37 days.

(21) Appl. No.: 10/018,173
(22) PCT Filed: Jun. 13, 2001
(86) PCT No.: PCT/JP01/05024
§ 371 (c)(1), (2), (4) Date: Dec. 12, 2001
(87) PCT Pub. No.: WO02/02348
PCT Pub. Date: Jan. 10, 2002

(65) Prior Publication Data
US 2002/0149658 A1 Oct. 17, 2002

(30) Foreign Application Priority Data
Jul. 4, 2000 (JP) .................................. 2000-239171

(51) Int. Cl.⁷ .................................................. B41J 2/01
(52) U.S. Cl. ...................... 347/101; 347/105; 347/102
(58) Field of Search ................................ 347/105, 101, 347/1, 102; 428/195, 98, 103, 178, 187, 189; 346/135.1

(56) References Cited

U.S. PATENT DOCUMENTS

| | | | |
|---|---|---|---|
| 5,789,341 A | | 8/1998 | Furukawa |
| 5,984,467 A | * | 11/1999 | Bodager et al. ............. 347/101 |
| 6,299,302 B1 | * | 10/2001 | DeBoer et al. ............. 347/105 |

FOREIGN PATENT DOCUMENTS

| | | | | |
|---|---|---|---|---|
| JP | 07-322646 | | 6/1997 | |
| JP | 09156212 | * | 6/1997 | ............ B41M/5/00 |
| JP | 10-297197 | | 10/1998 | |
| JP | 10297197 | * | 11/1998 | .............. B41J/2/01 |
| JP | 10-101728 | | 10/1999 | |
| JP | 11-033986 | | 10/1999 | |
| JP | 11293572 | * | 10/1999 | .............. B41J/2/01 |
| JP | 10-284558 | | 4/2000 | |

* cited by examiner

Primary Examiner—Stephen D. Meier
Assistant Examiner—Manish Shah
(74) Attorney, Agent, or Firm—Dennis G. LaPointe; Mason Law, P.A.

(57) ABSTRACT

A method for forming an image, including providing an ink jet receiving film including a resin made film or substrate having a resin layer on its surface and an ink jet receiving layer provided thereon, ink jet printing an image on the ink jet receiving layer with an ink containing a sublimating or volatile dye, heating the ink jet receiving layer having the printed image to allow the printed image to migrate to the resin made film or to the surface resin layer of the substrate, and then peeling off the ink jet receiving layer as a film layer.

By the method of the present invention, a sharp full color image can be imparted using an ink jet printer on any desired film article having a resin layer on its surface in a state where the surface gloss is retained. Concerning film articles in a sheet state, a full color image of a predetermined size can be formed in a simple and inexpensive manner. This is because the operation of accurate registration between the transfer paper and film article that is indispensable in the conventional sublimating thermal transfer dyeing method is no longer employed.

5 Claims, No Drawings

IMAGE FORMATION

TECHNICAL FIELD

The present invention relates to a technology for imparting a color image onto a film article having a resin layer on its surface. More particularly, the present invention relates to a method for forming an image that is sharper and more glossy than that obtained by a conventional method for obtaining a transferred image by thermally transferring a color image printed on a transfer paper to a film article having a resin layer.

BACKGROUND ART

A sublimating thermal transfer dyeing method that thermally transfers a color image preliminarily printed on a transfer paper has heretofore been known. In this method, while intimately contacting an imagewise ink jet printed transfer paper printed using a sublimating ink containing a sublimating dye as a colorant and a polyester fabric each other for pressurization, they are heated at about 190 to about 200° C. for 30 to 60 seconds at atmospheric pressure to evaporate the sublimating dye, thereby dyeing the polyester fabric.

In a developed form of the method, a method has been used that intimately contacts the transfer paper as described above on a film article having heat resistance, such as a polyester film or a polycarbonate film, or a film article comprising a more general-purpose film article having laminated thereon a crosslinked type clear resin layer, in a roll form or a sheet form under vacuum and heats them at a temperature of about 150 to about 170° C. for about 2 to about 5 minutes to dye the clear resin of the surface layer. In many cases, these are provided as articles preliminarily treated with a pressure-sensitive adhesive on its rear surface.

The sublimating thermal transfer dyeing method for the polyester fabric described above performs the dyeing by impregnating a sublimating dye incorporated in an ink solvent to a transfer paper and drying it, volatilizing the sublimating dye that is present in the form of an aggregation by heating so as to reach the interface between the transfer paper and the polyester fabric that are in closer contact due to the pressurization and its neighborhood as well as diffuse into the polyester filaments to thereby dye them. In the case where such a polyester fabric is to be dyed, pressurization at about 300 g/cm$^2$ and a high temperature of about 190° C. or more are indispensable. This is because the fabric is of a woven structure so that it forms an adiabatic body that traps a large amount of air therein and hence it is necessary to remove the trapped air and substantially elevate the temperature of the contact surface between the fabric and the transfer paper. Also, this is because the sublimating dye must be exposed to a high temperature in order to convert it into a gaseous state so that it can reach to parts that are not in contact with the transfer paper even by the pressurization pressure. Further, this is because in the case of polyester filaments, the orientation in the process of spinning increases the degree of crystallinity of the polyester to make it difficult for the dye to diffuse therein so that greater energy is required for the dyeing.

In the sublimating thermal transfer dyeing method for the transfer to the heat resistant film articles described above, the pressurization to increase the degree of contact of the transfer paper to the film article and also the action of heat simultaneously applied bring the film article into a softened state, so that the texture of the rough surface of the transfer paper is inevitably transferred onto the surface of the film article as an embossed pattern. As a result, the gloss that the surface of the film article has had originally is deteriorated markedly, so that a glossy, sharp transferred image could not be obtained. Accordingly, thermal transfer is performed by pressurization at most at the level of intimate contact achieved under vacuum. However, even in this case, it is impossible to retain the gloss that the film article has had originally. Thus, even in the case of film articles having high heat resistance, perfect thermal transfer could not be effected. Much less, film articles having low heat resistance have problems not only that a glossy surface cannot be obtained but also that the transfer paper and the film article tend to bond to each other, so that the sublimating thermal transfer dyeing method can by no means be practiced.

Therefore, a first object of the present invention is to provide a method for forming an image on any desired film article having a resin layer on its surface using an ink jet printer with a sublimating ink such that a full color image that retains the original gloss on the surface of the film can be imparted.

On the other hand, film articles used in the sublimating thermal transfer dyeing method are not limited to those products that are wound in a roll state. However, in many cases, they include those utilized in a sheet state, such as those cut into a standardized size in the field of applications such as an ID card and a photograph and those cut into a form size (A4 or A3). In these cases, an image is temporarily ink jet printed on a transfer paper and then intimately contacted with a film article in a sheet state in an accurate registration and heated. In this method, an accurate registration operation is required for each sheet so that an enormous work is necessary for a large number of sheets. Also, there is the problem that the vertical and horizontal sizes of transfer paper may vary in several percentages (%) or more in the heating step after the transfer depending on the level of moisture absorption at ambient temperature so that the sizes of image of the film article after the thermal transfer cannot be precisely maintained at predetermined sizes.

Therefore, a second object of the present invention is to provide a method for forming an image using an ink jet printer with a sublimating ink such that a predetermined full color image on the surface of the film can be imparted on a large number of film articles in a sheet state having a predetermined size in a simple and inexpensive manner.

DISCLOSURE OF THE INVENTION

In view of the above problems, the present inventor made extensive studies. As a result, he has found that preliminarily laminating an ink jet receiving layer on a film article on which a color image is to be formed, color printing an image with a sublimating ink on the ink jet receiving layer by an ink jet method and then heating the image enables the printed image to pass through the ink jet receiving layer to diffuse on the surface of the film article and further, for a part thereof, into the inside thereof. Thereafter, peeling off the ink jet receiving layer as a film layer results in the transfer of the image depicted on the ink jet receiving layer onto the film article as a glossy, sharp transferred image. The present invention is achieved based on the above discovery.

That is, the present invention provides the following image forming methods.

1. A method for forming an image, comprising providing a laminate film comprising a resin made film or a substrate having a resin layer on its surface and an ink jet receiving layer provided thereon, ink jet printing an image on the ink jet receiving layer with an ink containing a sublimating or volatile dye, heating the ink jet receiving layer having the printed image to allow the printed image to migrate to the resin made film or to the surface resin layer of the substrate, and then peeling off the ink jet receiving layer as a film layer.

2. The method for forming an image according to item 1 above, wherein a laminate resin is used that comprises a resin having affinity for the sublimating dye and a resin overlying thereon having no affinity for the sublimating dye as the resin of the resin made film or of the surface resin layer of the substrate.

3. A method for forming an image according to item 2 above, wherein the resin having no affinity for the sublimating dye is a fluorine-based resin, a silicone-based resin or an olefin-based resin.

4. A method for forming an image according to item 1 above, wherein the laminate film used comprises a lubricant, a releasing agent, or a blocking preventing agent coated on the resin made film or on the surface resin layer of the substrate and the ink jet receiving layer provided thereon.

5. A method for forming an image according to item 1 above, wherein the heating is performed in a non-contact system.

DETAILED DESCRIPTION OF THE INVENTION

The sublimating dye used in the sublimating thermal transfer dyeing method generally has a small molecular weight of about 300 or less. So it has the property of diffusing into the inside of the resin by a molecular diffusion process even when it has not reached to its evaporation temperature. This phenomenon is commonly observed in resins in general although there may be a difference in level of whether diffusion into the particular resin occurs easily or hardly. It may be considered to be attributable to the participation of molecular diffusion action based on this property that the above-mentioned sublimating thermal transfer dyeing method for heat resistant resins can be efficiently practiced at about 150° C., which is lower than the evaporation temperatures of general dyes.

This means that unlike the conventional sublimating thermal transfer dyeing method using a currently prevailing transfer paper, in which the rough surface of the transfer paper and a film article are physically superposed one on another to bring them into contact, a laminate structure comprising different materials preliminarily laminated as a continuous layer allows a sublimating dye to efficiently diffuse across the contact surface of the laminate at a relatively low temperature by molecular diffusion. In other words, it means that such diffusion can be realized without using a transfer paper by adopting a method that comprises preparing an ink receiving film of a structure in which an ink jet receiving layer composed mainly of a water-soluble resin is laminated on a film article and directly printing an image with a sublimating ink thereon.

Generally, the thickness of the resin layer that is laminated as an ink jet receiving layer for ink jet printing is very small; e.g., it is as small as about 20 $\mu$m or less. As a result the sublimating dye can smoothly diffuse to the resin layer that constitutes the base without causing spreading toward the peripheral portion. In addition, when the water-soluble resin that is less compatible with a sublimating dye, the sublimating dye does not remain therein but advantageously a most part of it diffuses to the target film article.

At the time when an image is formed on the ink jet receiving layer of a film article by ink jet printing, the ink (sublimating dye) penetrates into the depth of the ink jet receiving layer. It further reaches the interface between the base resin layer and the ink jet receiving layer or the neighborhood thereof. Heating performed in this state results in the migration of the sublimating dye by uniform diffusion of the molecules thereof from the resin that constitutes the ink jet receiving layer and the surface of the resin layer that continuously contacts the ink receiving layer to the inside of the resin. To be important, the coating provides uniform contact of the ink jet receiving layer and the film article to each other, so that no pressurization is required at all. The dyeing is completed in about 1 minute at 200° C., or in about 2 to about 5 minutes at 160° C., in the case where a non-contact heating method that leaves it in a thermostatic chamber is adopted. However, this may vary depending on the material characteristics and heat capacity of the film article.

Then, the ink jet receiving layer is peeled off from the film article as a film layer to obtain a film article having an image formed on the surface thereof.

In the method of the present invention, the dyeing is performed without applying pressure onto the surface of the film article that has been softened by heating, which is unlike the currently prevailing sublimating thermal transfer dyeing method that uses a transfer paper, so that the original gloss of the surface of the film article is not deteriorated and a glossy, sharp image can be obtained.

The film article that is dyed by the method of the present invention is not particularly limited. Those materials obtained by laminating a resin layer on any film-like substrate such as metal, paper, or wood may be treated in the same manner to obtain glossy, sharp images, respectively.

As described above, in the method of the present invention, there is no idea of using a transfer paper, so that pressurization that is indispensable in a conventional sublimating thermal transfer dyeing method is unnecessary. As a result, a conventional type large-scale thermal transfer machine that has been required for applying a certain pressure over the entire transfer area is no longer necessary.

After directly printing an image with a sublimating ink on the ink jet receiving layer laminated on the film article, the heating for diffusing and migrating the sublimating dye from the ink jet receiving layer to the film article may be performed. Any heating method may be adopted to perform the heating as far as it can uniformly apply a certain amount of heat thereto.

In view of product quality and cost, a preferred method includes, for example, a method of leaving the printed film for a certain time in a thermostatic chamber or a method of passing the printed film through a thermostatic chamber at a certain speed. In the case of the latter method, an apparatus in which a heating apparatus integrated with an ink jet printer may be designed so that the film continuously outputted from the ink jet printer is passed through the heating apparatus in synchronization therewith.

In the method of the present invention, accurate registration between the transfer paper and the film article does not exist, so that almost no manual operation is required in the heating step. Even in the case of sheet state film articles the entire process can be designed as an automated line.

As for the image after the printing, the image formed on the ink jet receiving layer that has been temporarily integrated with the film article diffuses and migrates into the surface layer of the underlying film article as it is in the heating step. As a result, always an image of a predetermined size can be obtained without adversely influenced by the moisture in the atmosphere.

If the gloss of the surface of the film article is not so important, the heating method is not limited to the non-contact method. The system of the present invention may be considered to use one in which a conventional printed transfer paper and a film article to be superposed thereon have been integrated to each other from the beginning. From this viewpoint, it is apparent that a conventional iron press type thermal transfer machine or rotary press type thermal transfer machine can be used in the same manner. In such a heating method, the method of the present invention exhibits a great cost reduction effect from the viewpoints of paper costs and of process simplification due to the fact that no transfer paper has to be used.

The ink jet receiving layer must be smoothly peeled off as a film layer from the film article after the heating step. The peelability of the ink jet receiving layer is a factor that depends on the chemical activity of the surface itself of the film article or the chemical activity of a coating resin thereon, if any, and the adhesive strength of the resin that constitutes the ink jet receiving layer.

However, the ink jet receiving layer has been subjected to the heating step at about 200° C. and hence is in a state where the moisture content thereof is zero, so that it has a very weakened adhesion with the film article and an increased film property. In the case of polyvinyl alcohol or the like, crystallization proceeds by heating, which further increases the film property. From these it follows that in may cases the ink jet receiving layer after the heating can be readily peeled off as a film layer.

Generally, a layer of a chemically inert resin such as a fluorine based resin, a silicone based resin or an olefin based resin provided on the surface of the film article can in most cases be smoothly peeled after the dyeing and heating.

Here, the fluorine based resin that can be used includes, for example, homopolymers of fluoroolefin, copolymers of fluoroolefin, or copolymers of fluoroolefin with a monomer or monomers other than the fluoroolefin. Specific examples thereof may include polyvinyl fluoride, polyvinylidene fluoride, polytetrafluoroethylene, tetrafluoroethylene/perfluoroacryl vinyl ether copolymer, tetrafluoroethylene/hexafluoropropylene copolymers, tetrafluoroethylene/ethylene copolymers, polychlorotrifluoroethylene and so forth.

The silicone based resin may include pure silicone resin, silicone-modified (alkyd, epoxy, phenol, urethane, acrylic and melamine) resins and so forth.

The olefin based resin may include polyethylene, polypropylene, polyvinyl chloride and so forth.

In this case, as disclosed in the invention "Process for producing dyed laminated products" (Japanese Patent No. 2,847,588, U.S. Pat. No. 5,364,412) by the present inventor, resins of chemically inactive type simultaneously have no affinity for the sublimating dyes. In the case where a structure is adopted in which a resin having high affinity for the sublimating dye, such as a polyester resin or polyurethane resin, is simultaneously laminated on the above resin, the sublimating dye on the non-affinity resin upon heating passes through the non-affinity resin layer and migrates into the affinity resin layer to dye it therewith.

For this reason, when practicing the method of the present invention in the case where a resin that has no affinity for the sublimating dye, such as a fluorine based resin, is laminated as the uppermost layer, it is important to design such that the above-mentioned affinity resin shall be present adjacent thereto as an underlying layer. Also, in the case where the film article is composed of a very hard resin such as a polycarbonate resin or an acrylic resin, the adhesive strength of the ink jet receiving layer is weak. As a result the ink jet receiving layer can be smoothly peeled off as a film layer in many cases.

Note that in the case of an ink jet receiving layer that is difficult to peel off, a fluorine based or silicone based lubricant, releasing agent, blocking preventing agent or the like may be advantageously coated on the surface of the film article in advance.

The sublimating ink used in the ink jet printing in the present invention is an aqueous ink that contains water as a solvent. For this reason, the resin that constitutes the ink jet receiving layer is composed mainly of a water-soluble resin that can quickly absorb and receive the ink. The water-soluble resin means a natural or synthetic polymer that is soluble in water or hydrophilic.

There can be used, for example, one or more members selected from polyvinyl alcohol based resins, polyvinyl acetal based resins, polyvinyl methyl ether, vinyl methyl ether/maleic anhydride copolymers, polyvinylpyrrolidone, vinylpyrrolidone/styrene copolymers, vinylpyrrolidone/vinyl acetate copolymers, water-soluble acrylic resins synthesized from a monomer such as acrylic acid, methacrylic acid, acrylic acid ester, or a methacrylic acid ester and other monomer(s), vinyl resins such as polyacrylamide, synthetic resins such as polyethylene oxide and polyglutamic acid, semi-synthetic resins such as cellulose derivatives, e.g., carboxymethylcellulose and methylcellulose, natural resins such as chitin, chitosan, starch and gelatin, and so forth.

Also, there can be used polyanionic polymeric electrolytes such as alkali metal salts of polyacrylic acid, polystyrenesulfonic acid and so forth, or polycationic polymeric electrolytes such as polyethyleneimine, polyvinylamine, polyallylamine, polyvinylalkylammonium halide, and polyvinyl benzylalkylammonium halide or amphoteric polymeric electrolytes.

For improving the drying property and anti-blocking property of ink, an overcoat layer that comprises a hydrophilic resin having dispersed therein inorganic fine particulate (silica, titanium oxide and so forth) may be provided on the ink jet receiving layer. The hydrophilic resin is a resin that is insoluble in water at least at room temperature but has ink permeability. Mention may be made of, for example, polyvinyl acetal based resins such as polyvinyl formal, polyvinyl acetoacetal and polyvinyl butyral, polyalkyl vinyl ethers such as polyvinyl isobutyl ether, hydrophilic acrylic resins such as those synthesized from acrylic acid, methacrylic acid or esters thereof, and hydrophilic polyester resins and so forth.

The thickness of the ink jet receiving layer is generally about 3 to about 20 $\mu$m, preferably about 5 to about 15 $\mu$m. If the thickness is too small, the put-down ink cannot be quickly absorbed upon the printing and the put-down ink droplets coalesce with each other on the surface of the ink jet receiving layer, so that a high quality image cannot be printed. Conversely, if the thickness of the ink jet receiving layer is too large, the sublimating dye must diffuse too long a distance from the ink jet receiving layer to the surface of resin layer. This is detrimental for realizing high density and high resolution.

The sublimating dye that can be used in the present invention may be any dye that has sublimating or volatilizing function. Preferably, it is a dye that sublimates or evaporates at 70 to 260° C. at atmospheric pressure. Such a dye includes, for example, dyes having sublimating or volatile property, such as azo, anthraquinone, quinophthalone, styryl, di- or triphenylmethane, oxazine, triazine, xanthene, methyne, azomethylne, acridine, and diazine.

In addition thereto, mention may be made of dyes such as 1,4-dimethylaminoanthraquinone, 1,5-dihydroxy-4,8-diaminoanthraquinone bromide or chloride, 1,4-diamino-2,3-dichloroanthraquinone, 1-amino-4-hydroxyanthraquinone, 1-amino-4-hydroxoy-2-(β-methoxyethoxy)anthraquinone, 1-amino-4-hydroxy-2-phenoxyanthraquinone, 1,4-diaminoanthraquinone-2-caroxylic acid methyl, ethyl, propyl or butyl ester, 1-amino-4-anilidoanthraquinone, 1-amino-2-cyano-4-anilido (or cyclohexylamino)anthraquinone, 1-hydroxy-2-(p-acetaminophenylazo)-4-methylbenzene, 3-methyl-4-(nitrophenylazo)pyrazolone, and 3-hydroxyquinophthalone.

As the basic dye, there can be used Malachite Green, Methyl Violet and so forth. Further, there can also be used dyes modified with sodium acetate, sodium ethanolate, sodium methylate or the like.

BEST MODE FOR CARRYING OUT THE INVENTION

Hereinafter, the present invention will be described by examples. However, the present invention should not be limited to the following examples.

EXAMPLE 1

A gloss film for sublimating thermal transfer (Kiwa Chemical Industries Company Ltd.) was provided. This was made by coating on a 50-μm thick polyester film a urethane resin based dye fixing layer and a trifluoroethylene resin layer in order so as to have a thickness of 15 μm, respectively, followed by crosslinking and further applying a pressure-sensitive adhesive layer and a separator on the back side of the film. On this was laminated a crosslinking type coating agent "Patelacol IJ-50" (tradename, manufactured by Dainippon Ink and Chemicals, Inc.) for a urethane based ink jet receiving layer to a thickness of 8 μm to form an ink jet receiving layer. On this was discharged 4 color set sublimating ink (manufactured by ECS Co.) using an ink jet printer "MJ-8000C" (trade name, manufactured by Seiko Epson Corporation) to print a full color image. The printed film was left in a thermostatic chamber at 160° C. for 4 minutes and then taken out. When a pressure-sensitive adhesive tape was pressed on one end of the film and then pulled, the entire ink jet receiving layer could be readily peeled off as a film layer. As a result, the gloss film was imagewise dyed intensely and sharply. In addition, the gloss of the film surface was retained as it was originally. Observation of the section of the film revealed that a most part of the sublimating dye passed through the trifluoroethylene resin layer to dye the dye fixing layer therewith.

EXAMPLE 2

Procedures were practiced under quite the same conditions as in Example 1 except that instead of Patelacol in Example 1, polyvinyl alcohol "PVA217" (trade name, degree of polymerization: 1700, degree of saponification: 88 mol %, manufactured by Kuraray Co., Ltd.) was coated. As a result, similar results to those in Example 1 were obtained.

EXAMPLE 3

Procedures were practiced under quite the same conditions as in Example 1 except that instead of Patelacol in Example 1, a styrene/quaternary ammonium salt copolymer "Gohsefimer C-82" (trade name, produced by Nippon Synthetic Chemicals Industry Co., Ltd.) was coated. As a result, similar results to those in Example 1 were obtained.

EXAMPLE 4

Lamination, full color image printing and heating of the ink jet receiving layer were practiced under the quite the same conditions as in Example 1 except for the following. That is, instead of the gloss film used in Example 1, a 100 μm thick polycarbonate film "Polyca Ace ECG100" (trademark, manufactured by Tsutsunaka Plastic Industry Co., Ltd.) was used. When a pressure-sensitive adhesive tape was pressed on one end of the heated film and then pulled, the entire ink jet receiving layer could be readily peeled off as a film layer. As a result, the polycarbonate film was imagewise dyed intensely and sharply. The gloss of the film surface was retained as it was originally.

EXAMPLE 5

Procedures were practiced under quite the same conditions as in Example 4 except that instead of Patelacol as in Example 1, PVA217 used in Example 2 was coated. As a result, similar results as those obtained in Example 4 were obtained.

EXAMPLE 6

Procedures were practiced under quite the same conditions as in Example 4 except that instead of Patelacol as in Example 1, Gohsefimer used in Example 3 was coated. As a result, similar results as those obtained in Example 4 were obtained.

EXAMPLE 7

Formation, full color image printing and heating of the ink jet receiving layer were practiced under the quite the same conditions as in Example 1 except for the following. That is, instead of the gloss film used in Example 1, a 50-μm thick transparent polyester film "Teijin Tetron Film S6" (trade name, manufactured by Teijin Limited) coated with a silicone based blocking preventing agent "Simac US-352" (trademark, manufactured by Toa Gosei Chemical Industry Co., Ltd.) to a thickness of 1 μm was used. When a pressure-sensitive adhesive tape was pressed on one end of the heated film and then pulled, the entire ink jet receiving layer could be readily peeled off as a film layer. As a result, the polyester film was imagewise dyed intensely and sharply. In addition, the gloss of the film surface was retained as it was originally.

EXAMPLE 8

Procedures were practiced under quite the same conditions as in Example 7 except that no blocking preventing agent was used and that instead of Patelacol as the ink jet receiving layer, PVA217 used in Example 2 was coated. As a result, similar results as those obtained in Example 7 were obtained.

EXAMPLE 9

Procedures were practiced under quite the same conditions as in Example 7 except that no blocking preventing agent was used and that instead of Patelacol as the ink jet receiving layer, Gohsefimer used in Example 3 was coated. As a result, similar results as those obtained in Example 7 were obtained.

EXAMPLE 10

Instead of the gloss film in Example 1, a laminate film was provided that was made by laminating two types of polyvinyl chloride resins, i.e., white and transparent polyvinyl chloride resins that contain a polyester based plasticizer "Adekacizer PN170" (trademark, produced by Asahi Denka Kogyo Co., Ltd.). The resins were each laminated to a thickness of 50 μm, i.e., 100 μm in total using a casting film forming apparatus (produced by Asahi Chemical Industry Co., Ltd.). On the transparent side of the laminate film was laminated Patelacol described in Example 1 as the ink jet receiving layer to a thickness of 8 μm. Thereafter, full color printing and heating were practiced under the quite the same conditions as in Example 1. When a pressure-sensitive adhesive tape was pressed on one end of the heated film and then pulled, the entire ink jet receiving layer could be readily peeled off as a film layer. As a result, the transparent film of polyvinyl chloride resin was imagewise dyed intensely and sharply with the white film of polyvinyl chloride resin as a background. The gloss of the transparent polyvinyl chloride film surface was retained as it was originally.

EXAMPLE 11

Procedures were practiced under quite the same conditions as in Example 10 except that instead of Patelacol, PVA217 described in Example 2 was coated. As a result, similar results as those obtained in Example 10 were obtained.

EXAMPLE 12

Procedures were practiced under quite the same conditions as in Example 10 except that instead of Patelacol, Gohsefimer described in Example 3 was coated. As a result, similar results as those obtained in Example 10 were obtained.

INDUSTRIAL APPLICABILITY

By the method of the present invention, a sharp full color image can be imparted on any desired film article having a resin layer on its surface in a state where the surface gloss is completely retained using an ink jet printer employing a sublimating ink. Concerning film articles in a sheet state, a full color image of a predetermined size can be made in a large lot without any substantial manpower. This is because the operation of accurate registration between the transfer paper and film article that is indispensable in the conventional sublimating thermal transfer dyeing method is no longer employed.

What is claimed is:

1. A method for forming an image, comprising:
   providing a laminate film comprising a resin made film or a substrate having a resin layer on its surface and an ink jet receiving layer provided thereon,
   ink jet printing a color image on the ink jet receiving layer with an ink containing a sublimating or volatile dye,
   heating the ink jet receiving layer having the printed image uniformly to allow the printed image to migrate to the resin made film or to the surface resin layer of the substrate,
   and then peeling off the ink jet receiving layer as a film layer.

2. The method for forming an image according to claim 1, wherein a laminate resin is used that comprises a resin having affinity for the sublimating dye and a resin overlying thereon having no affinity for the sublimating dye as the resin of the resin made film or of the surface resin layer of the substrate.

3. A method for forming an image according to claim 2, wherein the resin having no affinity for the sublimating dye is a fluorine-based resin, a silicone-based resin or an olefin-based resin.

4. A method for forming an image according to claim 1, wherein the laminate film used comprises a lubricant, a releasing agent, or a blocking preventing agent coated on the resin made film or on the surface resin layer of the substrate and the ink jet receiving layer provided thereon.

5. A method for forming an image according to claim 1, wherein the heating is performed in a non-contact system.

* * * * *